United States Patent [19]

Gaiser

[11] Patent Number: 4,571,943
[45] Date of Patent: Feb. 25, 1986

[54] TANDEM BRAKE BOOSTER WITH HYDRAULIC MECHANISM FOR REAR DIAPHRAGM FORCE REVERSAL

[75] Inventor: Robert F. Gaiser, Stevensville, Mich.
[73] Assignee: Allied Corporation, Morristown, N.J.
[21] Appl. No.: 585,082
[22] Filed: Mar. 1, 1984
[51] Int. Cl.⁴ .................... F15B 7/00; F15B 17/02; B60T 13/58; F01B 31/14
[52] U.S. Cl. .................................. 60/560; 60/563; 92/50; 91/460; 91/519
[58] Field of Search ............. 60/547.1, 563, 560; 92/50, 69, 75; 91/460, 422, 519, 174, 49

[56] References Cited

U.S. PATENT DOCUMENTS

| | | | |
|---|---|---|---|
| 3,013,536 | 12/1961 | Cripe | 60/547.1 X |
| 3,013,537 | 12/1961 | Schultz | 60/547.1 X |
| 3,362,298 | 1/1968 | Julow | 60/547.1 X |
| 4,096,696 | 6/1978 | Van House | 60/547.1 |
| 4,311,085 | 1/1982 | Runkle | 91/460 X |
| 4,387,626 | 6/1983 | Myers | 92/50 X |

Primary Examiner—Edward K. Look
Assistant Examiner—George Kapsalas
Attorney, Agent, or Firm—Ronald D. Welch; Ken C. Decker

[57] ABSTRACT

A vacuum brake booster includes a pair of diaphragms which move in opposite directions during a brake application. One of the diaphragms is connected to a valve assembly to generate a first force assisting braking while the other diaphragm generates fluid pressure in an output chamber formed substantially by the valve assembly. The fluid pressure in the output chamber generates a second force assisting braking.

12 Claims, 1 Drawing Figure

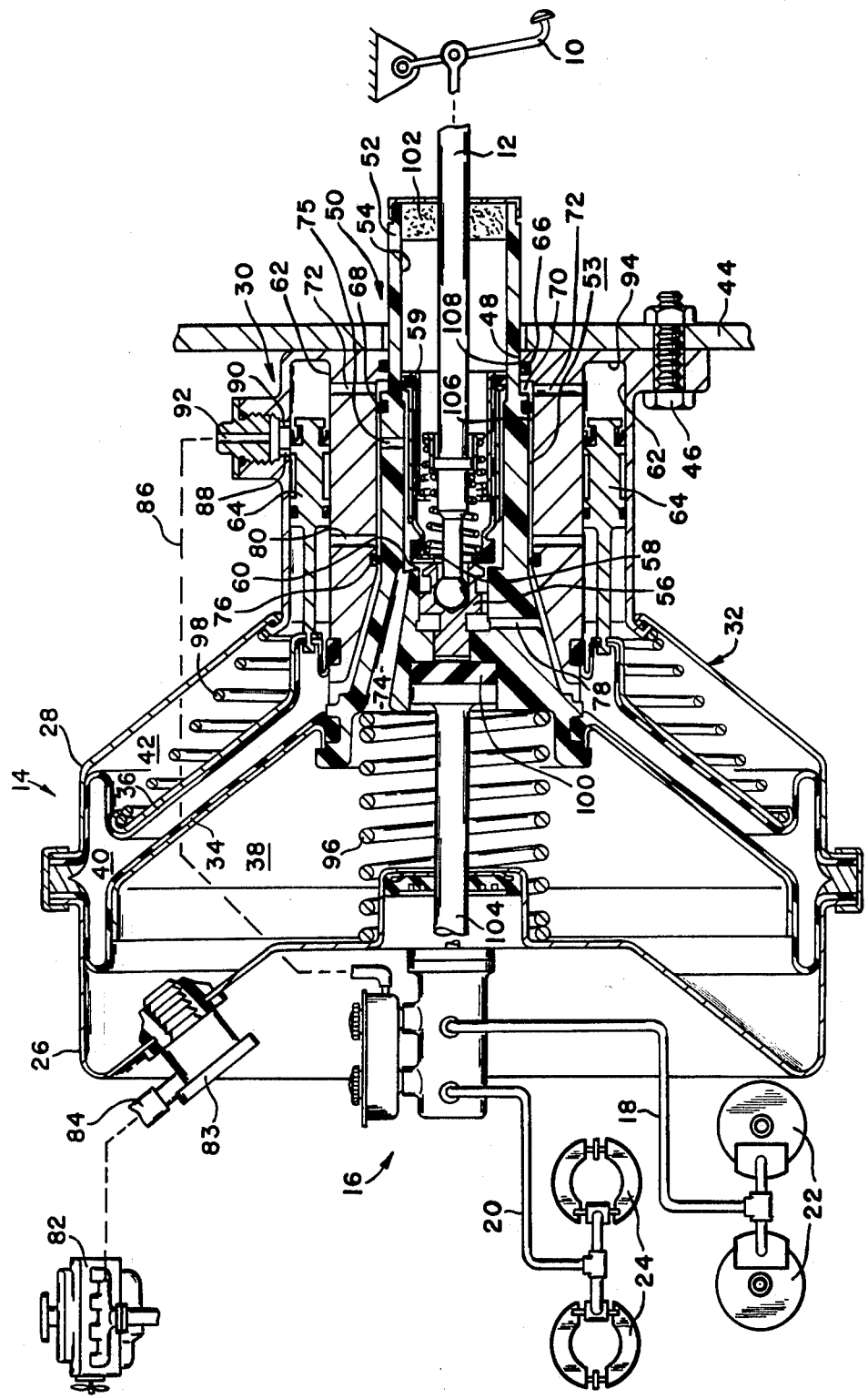

TANDEM BRAKE BOOSTER WITH HYDRAULIC MECHANISM FOR REAR DIAPHRAGM FORCE REVERSAL

BACKGROUND OF THE INVENTION

1. Field of the Invention

The present invention relates to a vacuum brake booster wherein a pair of diaphragms are pressure responsive to generate separate application forces during braking.

2. Description of the Prior Art

In U.S. Pat. No. 4,387,626 issued to Myers and assigned to the assignee of the present invention a tandem brake booster includes a pair of diaphragms which are pressure responsive to move in opposite directions. One of the diaphragms is directly coupled to a valve assembly to impart a first output force thereto, while the second diaphragm is connected with a lever arrangement to impart a second output force to the valve assembly in the same direction as the first output force even though the second diaphragm moves in an opposite direction to the one diaphragm. The valve assembly operatively connects with an output rod to control operation of a master cylinder or the like in a brake system. In certain situations the lever arrangement may not package as compactly as desired within the housing between the pair of diaphragms. Consequently, it is desirable to provide an alternative force transmitting connection between the second diaphragm and the valve assembly.

SUMMARY OF THE INVENTION

The present invention comprises a vacuum brake booster with a housing having a cavity receiving at least a pair of diaphragms dividing the housing cavity into a plurality of chambers, the housing movably carrying a valve assembly operable to control communication of fluid pressure to one of said plurality of chambers in order to move said pair of diaphragms in opposite directions during braking and impart separate forces to said valve assembly for movement of the latter in one direction so that a power assist is generated during the brake application, characterized in that said housing cooperates with said valve assembly to define an output pressure chamber and one of said plurality of diaphragms is movable in an opposite direction relative to movement of said valve assembly during the brake application to generate fluid pressure in said output pressure chamber to bias said valve assembly to move during the brake application.

It is an advantage of the present invention that the pair of diaphragms can be compactly disposed next to each other without a lever arrangement therebetween.

BRIEF DESCRIPTION OF THE DRAWING

The sole FIGURE in the drawing shows a brake system with a vacuum brake booster constructed in accordance with the present invention illustrated in cross section.

DESCRIPTION OF THE PREFERRED EMBODIMENTS

The brake system includes a brake pedal 10 coupled in an input rod 12 extending into a vacuum brake booster 14 to be described hereinafter. The vacuum brake booster 14 is connected to a master cylinder 16 with brake circuits 18 and 20 communicating the master cylinder 16 with brakes 22 and 24, respectively.

The vacuum brake booster 14 includes a front shell 26, a rear shell 28 and a support 30 forming a housing 32. The housing 32 forms a cavity receiving a pair of diaphragms 34 and 36 which separate a front chamber 38, a middle chamber 40 and a rear chamber 42. The support 30 is secured to a vehicle firewall 44 via bolts 46, and a central opening 48 on the support 30 receives a valve assembly 50 which is connected to the diaphragm 34 for movement therewith. The valve assembly 50 comprises a body 52 with an opening 54 receiving the input rod 12. The input rod 12 carries a plunger 56 opposing a poppet 58 in the rest position to sealingly engage the latter. The poppet 58 is sealingly engaged with the wall of body opening 54 via end seal 59. The body 52 defines a seat 60 spaced from the poppet 58 in the rest position shown.

The support 30 defines at least one bore 62 receiving a piston 64 which is secured to the diaphragm 36 for movement therewith. The sole FIGURE shows a top bore 62 and a bottom bore 62 with a top piston 64 in top bore 62 and a bottom piston 64 in bottom bore 62. Since the bores and pistons are identical, except for compensation, the following description will proceed with reference to only one bore and one piston. The support 30 cooperates with the body 52 via seals 66 and 68 at a small diameter section of opening 48 and a large diameter section of opening 48, respectively, to define an output pressure chamber 70. A first passage 72 in the support 30 communicates the one bore 62 with the output pressure chamber 70. The body 52 defines a second passage 74 leading from the front chamber 38 to communicate with the opening 54 adjacent the poppet 58 and to communicate with the interface 53 at the body 52 and the wall of support opening 48 via opening 75 between the seal 68 and a seal 76. The body 52 defines a third passage 78 extending from the opening 54 adjacent plunger 56 to the middle chamber 40. The support defines a fourth passage 80 extending from the body/support interface 53 to the rear chamber 42 via bore 62. Consequently, in the rest position shown, the front chamber, the middle chamber and the rear chamber are in communication with a vacuum source 82, such as an engine manifold, via conduit 84.

The valve assembly 50 is operable to control the communication of vacuum pressure from the vacuum source 82 to the middle chamber 40, as the front and rear chambers, 38 and 42, remain in communication with the vacuum source at all times. Although the chambers 38, 40 and 42 selectively communicate with a vacuum source, the bore 62 communicates via dotted line 86 with the master cylinder reservoir to provide for hydraulic brake fluid within the bore 62 to the right of piston 64 and the output pressure chamber 70. Suitable compensation and replenishing ports 88 and 90 are provided in the support 30 leading from an inlet 92 to the bore 62. Consequently, the piston 64 is movable toward a bottom end 94 to close bore 62 from inlet 92 and generate hydraulic fluid pressure in bore 62 and output chamber 70.

In the rest position, the pair of diaphragms 34 and 36 are disposed adjacent each other with return springs 96 and 98 biasing the pair of diaphragms, respectively, toward each other. The plunger 56 is sealingly engaged with the poppet 58 to retain the latter spaced from the seat 60. Consequently, the vacuum source communicates directly with the front chamber 38 via a check valve 83 and conduit 84, the front chamber 38 communicates with the rear chamber 42 via the second passage 74, bore 54, opening 75, the interface 53 and the fourth passage 80, and the front chamber 38 communicates with the middle chamber 40 via second passage 74, opening 54 and the third passage 78 as the poppet 58 is spaced from the seat 60. When the brake pedal is initially depressed during braking, the input rod 12 moves the plunger toward the master cylinder to engage a resilient reaction disc 100. At about the same time, the poppet is engaged with the seat to close the second passage 74 with the third passage 78. Further braking causes the plunger to separate from the poppet to admit atmospheric air into the middle chamber 40 via opening 54 with filter 102 therein, the spacing (not shown) between plunger 56 and poppet 58, and the third passage 78. With atmospheric pressure in the middle chamber and vacuum pressure in the front and rear chambers, the diaphragm 34 is biased to move in the direction of the master cylinder and the diaphragm 36 is biased to move in the direction away from the master cylinder. The diaphragm 34 is directly coupled to the body 52 to bias the latter via a first force to move toward the master cylinder and actuate the latter via an output rod 104. The diaphragm 36 is coupled to the piston 64 to move the latter toward the end wall 94. Movement of the piston 64 closes the port 92 to the bore 62 so that fluid pressure is generated in the bore 62 and the output chamber 70 via passage 72. Fluid pressure in the output chamber acts against a differential area of the body 52 to bias the latter via a second force toward the master cylinder. The differential area is limited by a large diameter section 106 of passage 48 at seal 68 and a small diameter section 108 of passage 48 at seal 66.

Upon termination of braking, the input rod 12 is displaced toward the brake pedal, as the latter is released, so that the plunger 56 engages the poppet 58 to separate the latter from the seat and close off atmospheric air to the middle chamber. The middle chamber is again communicated to the vacuum source to vent atmospheric pressure therein and the return springs 96 and 98 return the diaphragms to their rest position adjacent each other.

It is possible to provide a plurality of pistons 64 or to provide a single piston comprising an annular disc disposed within an annular recess comparable to bore 62. The front chamber 38 and the rear chamber 42 could also be kept in constant communication via an external conduit as shown in U.S. Pat. No. 4,387,626.

What is claimed is:

1. A vacuum brake booster comprising a housing with a cavity receiving at least a pair of diaphragms dividing the housing cavity into a plurality of chambers, the housing movably carrying a valve assembly operable to control communication of fluid pressure to one of said plurality of chambers in order to move said pair of diaphragms in opposite directions during braking and impart separate forces to said valve assembly for movement of the latter in one direction so that a power assist is generated during the brake application, characterized in that said housing cooperates with said valve assembly to define an output pressure chamber, one of said plurality of diaphragms being movable in an opposite direction relative to movement of said valve assembly during the brake application, piston means operatively connected to said one of said diaphragms to generate fluid pressure in said output pressure chamber in response to movement thereof in said opposite direction to bias said valve assembly to move in said one direction during the brake application.

2. The vacuum brake booster of claim 1 further including a master cylinder having a reservoir carrying a fluid therein, means selectively fluidly coupling said output pressure chamber to said master cylinder reservoir.

3. The vacuum brake booster of claim 1 further characterized by said housing comprising a front shell adapted for connection with a master cylinder and a rear shell extending from said front shell to a support adapted for attachment to a vehicle, said piston means including a bore in said support, a piston reciprocal in said bore and operatively connected with said one diaphragm.

4. The vacuum brake booster of claim 3 in which said support defines a central opening receiving said valve assembly, said support defining a first passage leading from said bore to said output pressure chamber, said valve assembly defining a second passage leading from said central opening to said one chamber.

5. The vacuum brake booster of claim 4 in which said support central opening defines a small diameter section sealingly engaging said valve assembly and a large diameter section sealingly engaging said valve assembly, said output pressure chamber extending between said sealing engagements.

6. The vacuum brake booster of claim 5 in which said output pressure chamber is annular and is defined by adjacent portions of said valve assembly and said central bore between said sealing engagements.

7. The vacuum brake booster of claim 3 in which said support fixedly carries an inner edge of said one diaphragm at an end of said support adjacent another of said pair of diaphragms and said support end opposes said valve assembly to define a rest position therefor upon release of braking and when said valve assembly is in a retracted position.

8. The vacuum brake booster of claim 3 in which said piston is operatively connected to said one diaphragm adjacent an inner edge therefore.

9. The vacuum brake booster of claim 3 in which said pair of diaphragms extend axially away from support in a radially outer direction.

10. The vacuum brake booster of claim 9 in which said front and said rear shell extend axially away from said support in a radially outer direction.

11. A vacuum brake booster comprising a housing divided with a pair of diaphragms oppositely moveable therein in response to a pressure differential and cooperating with a valve assembly to generate first and second application forces, respectively, biasing the valve assembly to move during a brake application, one of the pair of diaphragms being operatively coupled to the valve assembly, operation of the valve assembly causing a pressure differential across the one diaphragm to directly impart the first application force to the valve assembly, the other diaphragm being exposed to the same pressure differential and movable in response thereto, piston means operatively coupled to said second diaphragm to generate an auxiliary fluid pressure acting against the valve assembly, to impart said second application force to the valve assembly whereby the first and second application forces are applied to the valve assembly via different mediums.

12. The vacuum brake booster of claim 11 in which the valve assembly and the housing define an output pressure chamber, said piston means including a bore in said housing, and a piston in said bore to define an auxiliary pressure chamber communicating with the output pressure chamber, auxiliary fluid pressure being generated in the auxiliary pressure in response to movement of said second diaphragm and said piston in said chamber and communicated to the output pressure chamber.

* * * * *